(12) United States Patent
Nurmanbetov et al.

(10) Patent No.: US 12,718,017 B2
(45) Date of Patent: Aug. 25, 2026

(54) SYSTEM AND METHOD FOR PROVIDING LARGE LANGUAGE MODEL FOR SANCTIONS ARTIFICIAL INTELLIGENCE ASSISTED AUTOMATION

(71) Applicant: JPMorgan Chase Bank, N.A., New York, NY (US)

(72) Inventors: Daulet Nurmanbetov, Hoboken, NJ (US); John Hinrichsen, Brooklyn, NY (US); Samuel Beck, East Brunswick, NJ (US); Aya Wallwater, Brooklyn, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 222 days.

(21) Appl. No.: 18/371,717

(22) Filed: Sep. 22, 2023

(65) Prior Publication Data

US 2025/0103810 A1 Mar. 27, 2025

(51) Int. Cl.
*G06F 40/284* (2020.01)
*G06F 40/103* (2020.01)
*G06F 40/53* (2020.01)
*G06N 3/0455* (2023.01)

(52) U.S. Cl.
CPC .......... *G06F 40/284* (2020.01); *G06F 40/103* (2020.01); *G06F 40/53* (2020.01); *G06N 3/0455* (2023.01)

(58) Field of Classification Search
CPC ...... G06F 40/284; G06F 40/103; G06F 40/53; G06F 40/295; G06F 40/30; G06N 3/0455
See application file for complete search history.

(56) References Cited

U.S. PATENT DOCUMENTS

2003/0163417 A1* 8/2003 Cachey .................. G06Q 20/04 705/39
2005/0044197 A1* 2/2005 Lai .......................... H04L 67/02 709/223
2015/0081549 A1* 3/2015 Kimberg ............ G06Q 20/4016 705/44

(Continued)

OTHER PUBLICATIONS

Written Opinion dated Dec. 3, 2024 issued in International Patent Application No. PCT/US24/47724.

(Continued)

*Primary Examiner* — Darioush Agahi
(74) *Attorney, Agent, or Firm* — Greenblum & Bernstein, P.L.C.

(57) ABSTRACT

A method and system for reducing false-positives using a neural network are disclosed. The method includes receiving a data envelope, scanning the data envelope and detecting a presence of data corresponding to a value in a list of sanctioned entities. The method further includes transforming format of the data envelope into a text format, identifying and extracting target information including the data corresponding to the value in the list of sanctioned entities and surrounding information, and reformatting the extracted target information and surrounding information into a natural language question. Once the natural language question is provided, the natural language question is processed by a neural network model for determining whether a sanctioned entity is included or not based on context provided by the natural language question.

18 Claims, 9 Drawing Sheets

(56) References Cited

U.S. PATENT DOCUMENTS

2016/0314123 A1* 10/2016 Ramachandran ............................ G06F 16/24578
2019/0171944 A1* 6/2019 Lu .......................... G06N 5/022
2023/0196347 A1* 6/2023 Tate ................... G06Q 20/3825 705/75

OTHER PUBLICATIONS

International Search Report dated Dec. 3, 2024 issued in International Patent Application No. PCT/US24/47724.

* cited by examiner

Original XML envelope

. . . . . (continued above) . . . . .
<smc:OrderingParty>
<smc:AccountId smc:source="UOC">/RO37INGB0000000000000 </smc:AccountId>
<smc:PartyData smc:source="UOC">PETROTEL EXMOIL SA
Strada Henri Barbusse 16
PLOIESTI JUDET PRAHOVA ROMANIA H</smc:PartyData>
</smc:OrderingParty>
. . . . . (continued) . . . . .
<smc:Hit smc:id="1" smc:OFACId="ML00006483" smc:origin="JPM-BG" smc:hitType="BLOCKING" smc:entityType="COMPANY" smc:priority="0"
smc:confidentiality="0" smc:PEPImpact="false" smc:FEPImpact="false" smc:TYS="1" smc:ISN="0">
<smc:Location>/RelatedOriginal/OrderingParty[1]/PartyData</smc:Location>
<smc:MatchingText smc:score="1.0" smc:startPos="10" smc:endPos="15"> EXMOIL</smc:MatchingText>
<smc:OfficialReference>2022-03-09 17:02:43.0</smc:OfficialReference>
<smc:NameInfo>
<smc:Name smc:hitItem="true">Exmoil</smc:Name>
</smc:NameInfo>
. . . . . (continued below) . . . . .

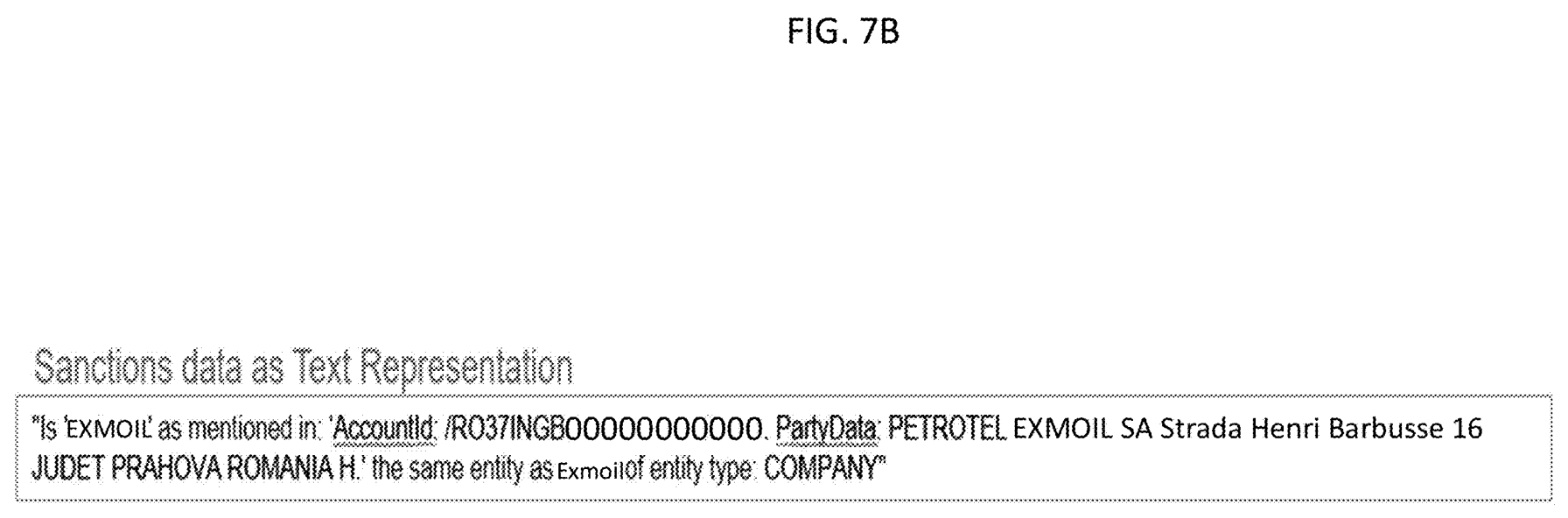

Sanctions data as Text Representation

"Is 'EXMOIL' as mentioned in: 'AccountId: /RO37INGB00000000000. PartyData: PETROTEL EXMOIL SA Strada Henri Barbusse 16 JUDET PRAHOVA ROMANIA H.' the same entity as Exmoilof entity type: COMPANY"

FIG. 7B

SYSTEM AND METHOD FOR PROVIDING LARGE LANGUAGE MODEL FOR SANCTIONS ARTIFICIAL INTELLIGENCE ASSISTED AUTOMATION

TECHNICAL FIELD

This disclosure generally relates to data processing. More specifically, the present disclosure generally relates to utilizing neural networks to automatically reduce false-positives.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Organizations may conduct numerous data transactions on behalf of various clients. However, such organizations may be under a legal requirement to ensure that the data transactions conducted is free of any sanctioned entities. Further, such legal requirement may additionally necessitate seizure and reporting of data transactions involving one or more sanctioned entities. The sanctioned entities may be either a global or local entity or a jurisdiction.

Although third party service providers may perform screening of sanctioned entities on behalf of one or more organizations, conventional services perform conservative scanning, opting to overproduce alerts (i.e., flagging transactions for potential involvement by one or more sanctioned entities), which may need to be further reviewed and cleared. However, due to such overproduction of false alerts, a large amount of computing resources (e.g., CPU and memory) may be unnecessarily expanded to capture, store and process all of the alerts. Further, due to the larger amount of alerts to be reviewed, potential error may occur on the secondary review, which may be resource constrained to perform more thorough reviews.

SUMMARY

According to an aspect of the present disclosure, a method for reducing false-positives using neural network is provided. The method includes receiving, by a processor, a data envelope; scanning, by the processor, the data envelope and detecting a presence of data corresponding to a value in a list of sanctioned entities; transforming, by the processor, format of the data envelope into a text format; identifying and extracting, by the processor, target information including the data corresponding to the value in the list of sanctioned entities and surrounding information; reformatting, by the processor, the extracted target information and surrounding information into a natural language question; processing, by a neural network model executed by the processor, the natural language question; and determining, by the neural network model executed by the processor, whether a sanctioned entity is included or not based on context provided by the natural language question.

According to another aspect of the present disclosure, the text corresponding to the value in the list of sanctioned entities includes a foreign language character.

According to another aspect of the present disclosure, the method further includes: when the sanctioned entity is determined to be included in the natural language question, preventing the data envelope from passing.

According to yet another aspect of the present disclosure, the method further includes when the sanctioned entity is determined to be included in the natural language question, reporting the data envelope to a government entity.

According to another aspect of the present disclosure, the context is determined by: tokenizing text of the natural language question to generate a plurality of tokens; processing the plurality of tokens through a plurality of transformer layers; removing a portion of the plurality of tokens while retaining a portion of the plurality of tokens; and performing a classification of the target information included in the natural language question based on the retained portion of the plurality of tokens.

According to a further aspect of the present disclosure, the plurality of tokens includes text tokens, a separator token, and a class token.

According to yet another aspect of the present disclosure, the separator token separates out one group of text tokens from another group of tokens.

According to a further aspect of the present disclosure, the plurality of tokens includes text tokens and a class token.

According to another aspect of the present disclosure, the class token is placed last in sequence among the plurality of tokens.

According to a further aspect of the present disclosure, the class token is able to process each of the plurality of tokens preceding the class token for generating the context.

According to a further aspect of the present disclosure, the retained portion of the plurality of tokens is a class token.

According to a further aspect of the present disclosure, the removed portion of the plurality of tokens includes the text tokens.

According to a further aspect of the present disclosure, the data envelope is provided in XML.

According to a further aspect of the present disclosure, the surrounding information is information other than the target information included in a same data field.

According to a further aspect of the present disclosure, when an entity type corresponding to the target information does not match with an entity type of the sanctioned entity, determining that there is no match.

According to a further aspect of the present disclosure, the target information included in the natural language question is determined to be the sanctioned entity when the target information corresponds to a name.

According to a further aspect of the present disclosure, the list of sanctioned entities includes an entity, an individual, and a country.

According to a further aspect of the present disclosure, the list of sanctioned entities includes names of the sanctioned entities and corresponding entity types.

According to an aspect of the present disclosure, a system for reducing false-positives using neural network is provided. The system includes a memory, a display and a processor. The system is configured to perform: receiving a data envelope; scanning the data envelope and detecting a presence of data corresponding to a value in a list of sanctioned entities; transforming format of the data envelope into a text format; identifying and extracting target information including the data corresponding to the value in the list of sanctioned entities and surrounding information; reformatting the extracted target information and surrounding information into a natural language question; processing, by a neural network model executed by the processor, the natural language question; and determining, by the neural network model executed by the processor, whether a sanctioned entity is included or not based on context provided by the natural language question.

According to another aspect of the present disclosure, a non-transitory computer readable storage medium that stores a computer program for reducing false-positives using neural network is provided. The computer program, when executed by a processor, causes a system to perform multiple processes including: receiving a data envelope; scanning the data envelope and detecting a presence of data corresponding to a value in a list of sanctioned entities; transforming format of the data envelope into a text format; identifying and extracting target information including the data corresponding to the value in the list of sanctioned entities and surrounding information; reformatting the extracted target information and surrounding information into a natural language question; processing, by a neural network model executed by the processor, the natural language question; and determining, by the neural network model executed by the processor, whether a sanctioned entity is included or not based on context provided by the natural language question.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 illustrates a system architecture for converting text tokens to higher level concepts for classification that is utilized in performing false-positive reduction in accordance with an exemplary embodiment.

FIGS. 7A-7C illustrate converting original data envelope into textual question that is inputted to a neural network model for determining within a certain probability whether the data envelope includes text that corresponding to a sanctioned entity performing false-positive reduction in accordance with an exemplary embodiment.

DETAILED DESCRIPTION

Figure 1:
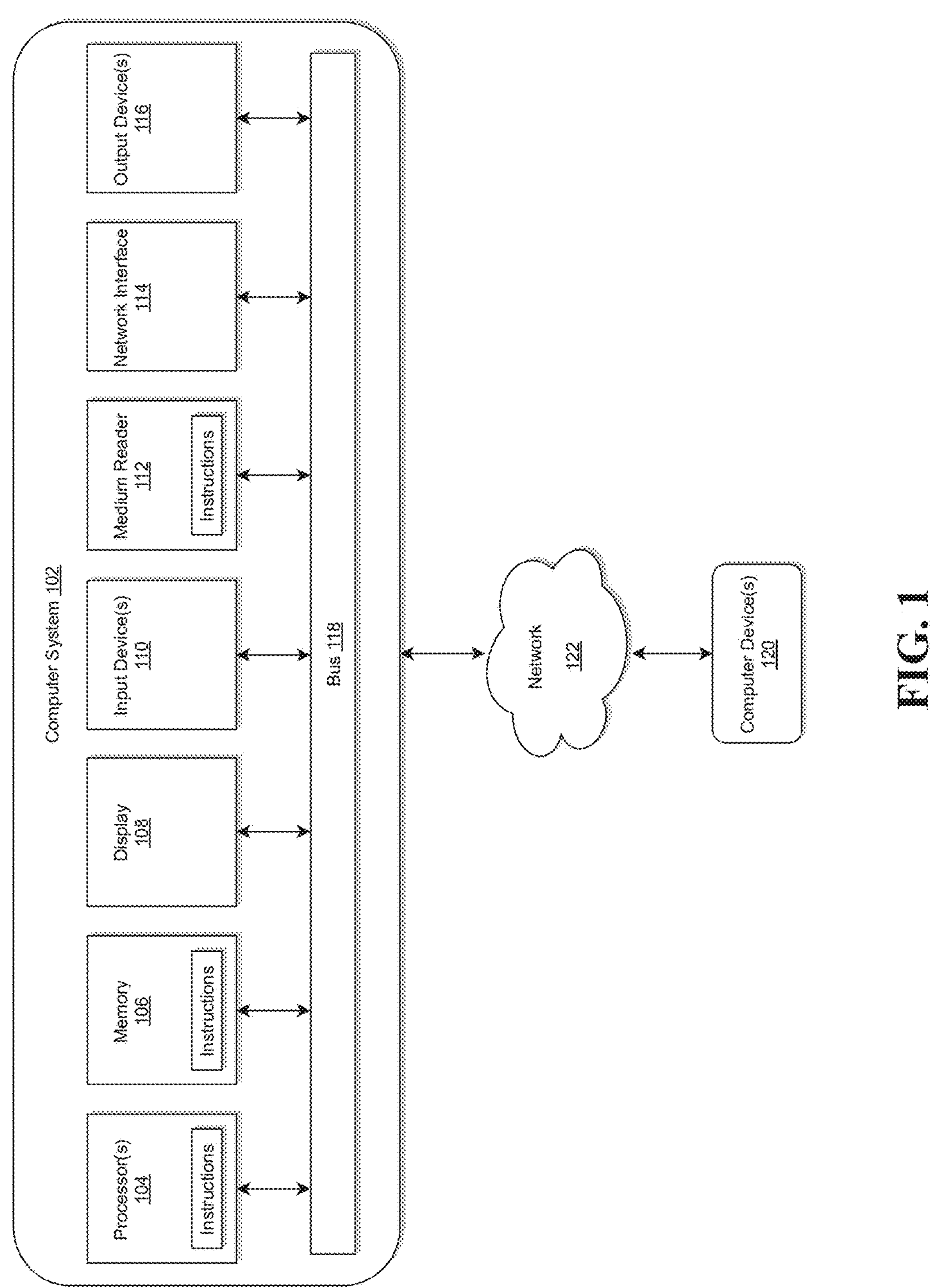
FIG. 1 illustrates a computer system for implementing a false-positive reduction (FPR) system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a false-positive reduction (FPR) system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
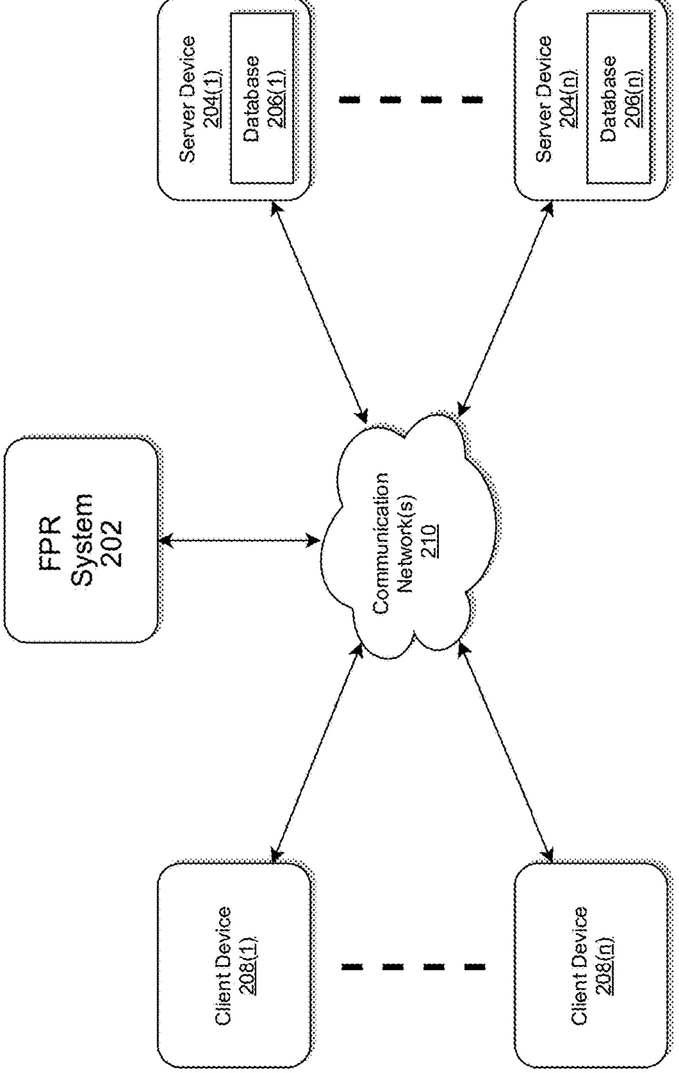
FIG. 2 illustrates an exemplary diagram of a network environment with a FPR system in accordance with an exemplary embodiment.

FIG. 2 illustrates an exemplary diagram of a network environment with a FPR system in accordance with an exemplary embodiment.

A FPR system 202 may be implemented with one or more computer systems similar to the computer system 102 as described with respect to FIG. 1.

The FPR system 202 may store one or more applications that can include executable instructions that, when executed by the FPR system 202, cause the FPR system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the FPR system 202 itself, may be located in virtual server(s) running in a cloud-based computing environment rather than being tied to one or more specific physical network computing devices. Also, the application(s) may be running in one or more virtual machines (VMs) executing on the FPR system 202. Additionally, in one or more embodiments of this technology, virtual machine(s) running on the FPR system 202 may be managed or supervised by a hypervisor.

In the network environment 200 of FIG. 2, the FPR system 202 is coupled to a plurality of server devices 204(1)-**204(*n*) that hosts a plurality of databases 206(1)-206(*n*), and also to a plurality of client devices 208(1)-208(*n*) via communication network(s) 210. According to exemplary aspects, databases 206(1)-206(*n*) may be configured to store data that relates to distributed ledgers, blockchains, user account identifiers, biller account identifiers, and payment provider identifiers. A communication interface of the FPR system 202, such as the network interface 114 of the computer system 102 of FIG. 1, operatively couples and communicates between the FPR system 202, the server devices 204(1)-204(*n*), and/or the client devices 208(1)-208(*n*), which are all coupled together by the communication network(s) 210**, although other types and/or numbers of communication networks or systems with other types and/or numbers of connections and/or configurations to other devices and/or elements may also be used.

The communication network(s) 210 may be the same or similar to the network 122 as described with respect to FIG. 1, although the FPR system 202, the server devices 204(1)-**204(*n*), and/or the client devices 208(1)-208(*n*) may be coupled together via other topologies. Additionally, the network environment 200** may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The FPR system 202 may be a standalone device or integrated with one or more other devices or apparatuses, such as one or more of the server devices 204(1)-**204(*n*), for example. In one particular example, the FPR system 202 may be hosted by one of the server devices 204(1)-204(*n*), and other arrangements are also possible. Moreover, one or more of the devices of the FPR system 202** may be in the same or a different communication network including one or more public, private, or cloud networks, for example.

The plurality of server devices 204(1)-**204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the FPR system 202 via the communication network(s) 210** according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-**204(*n*) may be hardware or software or may represent a system with multiple servers in a pool, which may include internal or external networks. The server devices 204(1)-204(*n*) hosts the databases 206(1)-206(*n*)** that are configured to store metadata sets, data quality rules, and newly generated data.

Although the server devices 204(1)-**204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*)** operates to manage and/or otherwise coordinate operations of the other network computing devices.

The server devices **204(1)-204(*n*)** may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices **208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*)**.

According to exemplary embodiments, the client devices **208(1)-208(*n*) in this example may include any type of computing device that can facilitate the implementation of the FPR system 202** that may efficiently provide a platform for implementing a cloud native FPR system module, but the disclosure is not limited thereto.

The client devices **208(1)-208(*n*) may run interface applications, such as standard web browsers or standalone client applications, which may provide an interface to communicate with the FPR system 202 via the communication network(s) 210 in order to communicate user requests. The client devices 208(1)-208(*n*)** may further include, among other features, a display device, such as a display screen or touchscreen, and/or an input device, such as a keyboard, for example.

Although the exemplary network environment 200 with the FPR system 202, the server devices **204(1)-204(*n*), the client devices 208(1)-208(*n*), and the communication network(s) 210** are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the FPR system 202, the server devices **204(1)-204(*n*), or the client devices 208(1)-208(*n*), for example, may be configured to operate as virtual instances on the same physical machine. For example, one or more of the FPR system 202, the server devices 204(1)-204(*n*), or the client devices 208(1)-208(*n*) may operate on the same physical device rather than as separate devices communicating through communication network(s) 210. Additionally, there may be more or fewer FPR system 202, server devices 204(1)-204(*n*), or client devices 208(1)-208(*n*) than illustrated in FIG. 2. According to exemplary embodiments, the FPR system 202 may be configured to send code at run-time to remote server devices 204(1)-204(*n*)**, but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
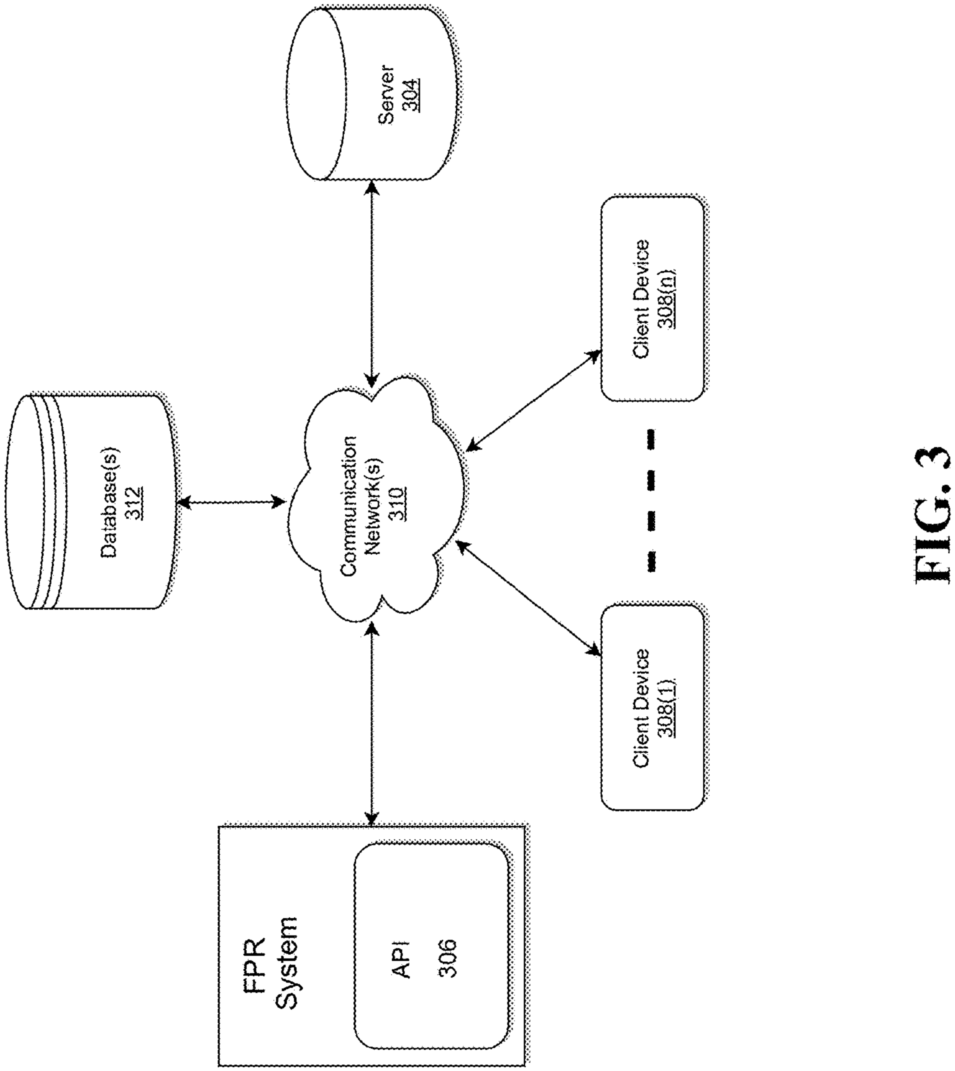
FIG. 3 illustrates a system diagram for implementing a FPR system in accordance with an exemplary embodiment.

FIG. 3 illustrates a system diagram for implementing a FPR system in accordance with an exemplary embodiment.

As illustrated in FIG. 3, the system 300 may include a FPR system 302 within which a group of API modules 306 is embedded, a server 304, a database(s) 312, a plurality of client devices 308(1) . . . **308(*n*), and a communication network 310**.

According to exemplary embodiments, the FPR system 302 including the API modules 306 may be connected to the server 304, and the database(s) 312 via the communication network 310. Although there is only one database that has been illustrated, the disclosure is not limited thereto. Any number of databases may be utilized. The FPR system 302 may also be connected to the plurality of client devices 308(1) . . . **308(*n*) via the communication network 310**, but the disclosure is not limited thereto.

According to exemplary embodiment, the FPR system 302 is described and shown in FIG. 3 as including the API modules 306, although it may include other rules, policies, modules, databases, or applications, for example. According to exemplary embodiments, the database(s) 312 may be embedded within the FPR system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . **308(*n*) via the communication network 310**.

The API modules 306 may be configured to implement a user interface (UI) platform that is configured to enable FPR system as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . **308(*n*) are illustrated as being in communication with the FPR system 302. In this regard, the plurality of client devices 308(1) . . . 308(*n*) may be "clients" of the FPR system 302 and are described herein as such. Nevertheless, it is to be known and understood that the plurality of client devices 308(1) . . . 308**(*n*) need not necessarily be "clients" of the FPR system 302, or any entity described in association therewith herein. Any additional or alternative relationship may exist between either or both of the plurality of client devices 308(1) . . . 308(*n*) and the FPR system 302, or no relationship may exist.

The first client device 308(1) may be, for example, a smart phone. Of course, the first client device 308(1) may be any additional device described herein. The second client device 308(*n*) may be, for example, a personal computer (PC). Of course, the second client device 308(*n*) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(*n*) may communicate with the FPR system 302 via broadband or cellular communication. Of course, these embodiments are merely exemplary and are not limiting or exhaustive.

The computing device 301 may be the same or similar to any one of the client devices 208(1)-208(*n*) as described with respect to FIG. 2, including any features or combination of features described with respect thereto. The FPR system 302 may be the same or similar to the FPR system 202 as described with respect to FIG. 2, including any features or combination of features described with respect thereto.

Figure 4:
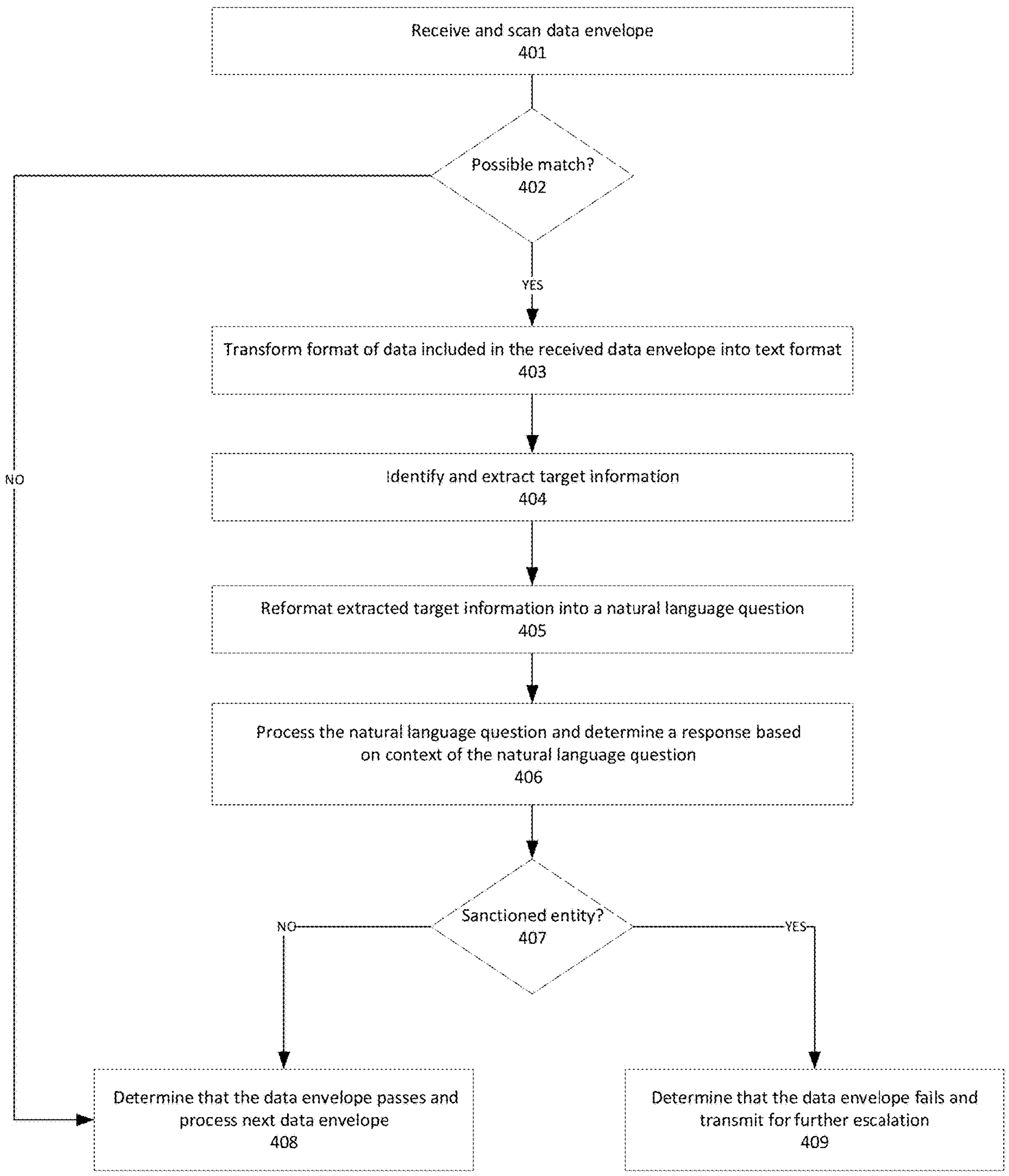
FIG. 4 illustrates a method for reducing false-positives in sanction screening using neural networks in accordance with an exemplary embodiment.

FIG. 4 illustrates a method for a method for automatically performing a secondary review to determine whether a text including a name of a sanctioned entity is actually a sanctioned entity in accordance with an exemplary embodiment.

According to exemplary aspects, existing decision tree or heuristic-based methods may be leveraged and modified to add automation for reducing a number of false positives to reduce amount of alerts requiring secondary reviews. More specifically, exemplary aspects implement a new approach transforms a task as a human readable text, instead of taking more classical machine-learning (ML) approaches (e.g., ChatGPT), where the transaction and the suspected sanctioned entity are sent to a model for further processing as plain text.

According to further aspects, the FPR system utilizes a neural network based transformer encoder or model for learning context of text information by tracking sequence and/or relationship between words or corresponding tokens in a transaction or data envelope. The neural network based transformer encoder or model may be trained in large number of different human languages (e.g., 100) to allow performance with respect to various languages that may be included various transaction or data envelopes.

In operation 401, transaction or data envelope may be received across a network and initial scanning may be performed on the received data envelope. According to exemplary aspects, the data envelope may be in a coding format, such as Extensible Markup Language (XML), JavaScript Object Notation (JSON), or the like. As exemplarily illustrated in FIG. 7A, the data envelope may be provided in an XML format and may include various information related to a requested transaction. For example, the data envelope may include data corresponding to various fields corresponding to an ordering or requesting party, such as account identifier, party data, entity type, quantity, requested amount and the like. Further, the data envelope may also include foreign characters. Initial scanning may be performed on the received data envelope to detect possible match with a sanctioned entity by comparing against a list of sanctioned entities stored in advance. According to exemplary aspects, the list of sanctioned entities may be provided in various languages, spelling, logos, icons, and other formats. Moreover, the list of sanctioned entities may also specify an entity type, such as country, company, and the like.

In operation 402, a determination is made whether the initial scanning identified any information that may potentially match with any value included in the list of sanctioned entities. According to exemplary aspects, if the match between the text included in the data envelope and a value included in the list of sanctioned entities is above a reference threshold (e.g., 0.85 or 85%), then it may be determined that there is a potential match. In an example, if the match between the two values are exact, then a score of 1.0 or 100% may be provided. If the match is not exact, perhaps due to a spelling error or variation, then the score may be lower. If no such possible match is found, the method proceeds to operation 409 where the neural network model determines that the data envelope passes and proceeds to process the next data envelope. Alternatively, if the initial scanning identifies information that may potentially match with a value included in the list of sanctioned entities, the method proceeds to operation 403 to transform format of data included in the received data envelope into text format for further analysis or processing.

As exemplarily illustrated in FIG. 7A, an original XML envelope may be received as a data envelope. Further, as illustrated in FIG. 7A, the XML envelope may include data corresponding to data field "AccountID", for which "RO37INGB0000000000000" is provided. Further, the XML envelope may include data corresponding to data field "PartyData", for which "PETROTEL EXMOIL SA Strada Henri Barbusse 16 PLOIESTI JUDET PRAHOVA ROMANIA H" is provided. In addition, data field "entityType" and data of "COMPANY" are also provided. For the provided data included in the XML envelope, it may be determined that the data includes matching text of "EXMOIL", which corresponds to a value in the list of sanctioned entities. If the match is exact, then a score of 1.0 may be provided. If the match is not exact, a different score may be indicated for the potential match.

More specifically, in operation 403, format of data included in the data envelope is transformed into a text format that may be processable via natural language processing (NLP). Program specific formatting information that may not convertible to text information may be discarded to reduce memory storage and to reduce processing load. Further, extraneous information or noise generated during the transformation may be removed for further efficiency.

In operation 404, after the conversion to the textual information, target information and surrounding information may be identified and extracted. For example, text information corresponding certain key fields may be identified and extracted. Such key fields may include, without limitation, account identifier, party data, and the like. Within the identified and extracted information, text matching (either exact or proximate) with a value in the list of sanctioned entities may be identified as target text or information for further analysis. Also, data field in which the target text or information was found is also identified. Based on the identification of the respective data field, text surrounding the target text or information within the same data field are also identified as surrounding text or information. According to exemplary aspects, the surrounding text or information may provide additional context in automatically deciphering whether the target text or information corresponds to one of the sanctioned entity or not.

In operation 405, the extracted target and surrounding information are reformatted into a natural language question. For example, referring to FIGS. 7A and 7B, the matching or target text or information of "EXMOIL" and surrounding text or information of "AccountID:/RO37INGB00000000000", "PartyData: PETROTEL EXMOIL SA Strada Henri Barbusse 16 JUDET PRAHOVA ROMANIA H", and "entity type: COMPANY" may be included in the natural language question. Based on the extracted target information, additional text or language is added to contextualize the question being asked. For example, as provided by FIG. 7B, the following question is phrased using the information extracted from the data envelope: "Is 'EXMOIL' as mentioned in: 'AccountID:/RO37INGB00000000000. PartyData: PETROTEL EXMOIL SA Strada Henri Barbusse 16 JUDET PRAHOVA ROMANIA H' the same entity as "Exmoil" of entity type: COMPANY"? Once formatted into a natural language question, it may be inputted to a neural network model for further processing. Although the present disclosure is provided with respect to a neural network, aspects of the present disclosure are not limited thereto, such that other compatible ML or artificial intelligence algorithm or model may be utilized.

In operation 406, the natural language question is read by a neural network model to determine whether the natural language question includes the sanctioned entity or not based on context of the natural language question or its underlying data. The operation 406 may be performed by sub-operations exemplarily illustrated in FIG. 5, which are discussed in more detail with reference to FIG. 5 below.

In operation 407, a determination is made whether or not the natural language question includes a sanctioned entity or not. If the natural language question is determined not to include the sanctioned entity, then the method proceeds to operation 408, where the data envelope is determined to be free of sanctioned entity and the data envelope or transaction is permitted to pass, and the method proceeds to process the next data envelope or transaction. On the other hand, if the natural language is determined to include the sanctioned entity, then the method proceeds to operation 409, where the data envelope is not allowed to pass or otherwise fail, and the data envelope is transmitted for further escalation. According to exemplary aspects, further escalation includes reporting to a governmental institution or sending the failed data envelope to an internal investigation group for further analysis and inquiry.

Figure 7C:
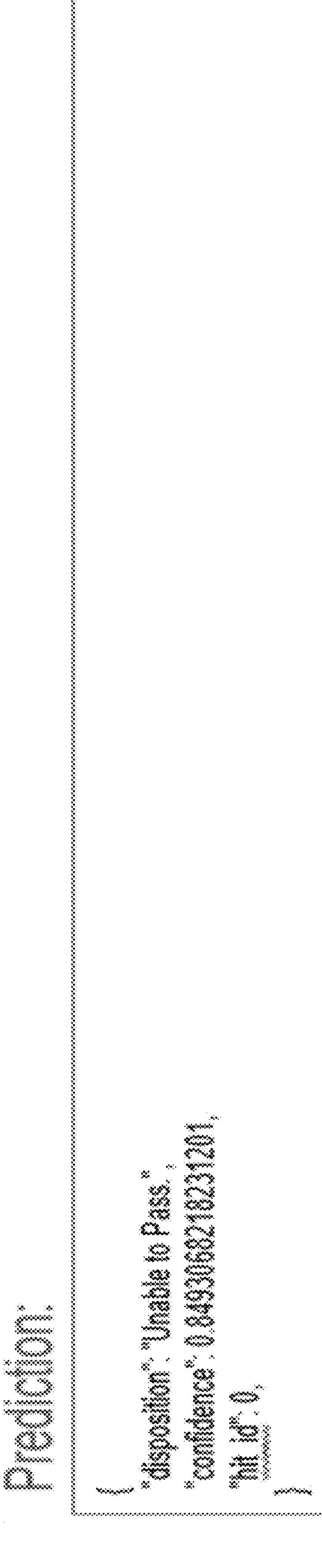

More specifically, operation 407, operation 408 and operation 409 are exemplarily discussed further in view of FIGS. 7B-7C. In reference to FIG. 7B, it may be noted that the target text or information of EXMOIL was included in the PartyData field including a physical mailing address. The neural network model may additionally note that the target text is preceded by the street name, which may indicate a name of the party or entity based on formatting of address information. Accordingly, based on the provided context, the neural network model may deduce that the data envelope received in operation 401 may include a sanctioned entity and may be unable to pass or complete the requested transaction. For example, the neural network may output a prediction based on the natural language question, indicating a disposition of "Unable to Pass" with a calculated confidence value as a response as exemplarily illustrated in FIG. 7C.

Alternatively, if the PartyData specified a different entity name (e.g., Company A) prior to providing the street address, which hypothetically includes the targeted text of EXMOIL, the neural network model may determine that the targeted text of EXMOIL included in the data envelope corresponds to a street name and not for a name of a company as stored in the list of sanctioned entities. In such a case, the neural network model may determine that the targeted text is of a different entity type (i.e., street address) from the entity type of the sanctioned entity (i.e., company), and therefore does not correspond to a sanctioned entity. In this example, at least since the targeted text only relates to a street name and not to a name of an entity, the data envelope may be determined to be free of sanctioned entities and is allowed to pass to complete a transaction.

Figure 5:
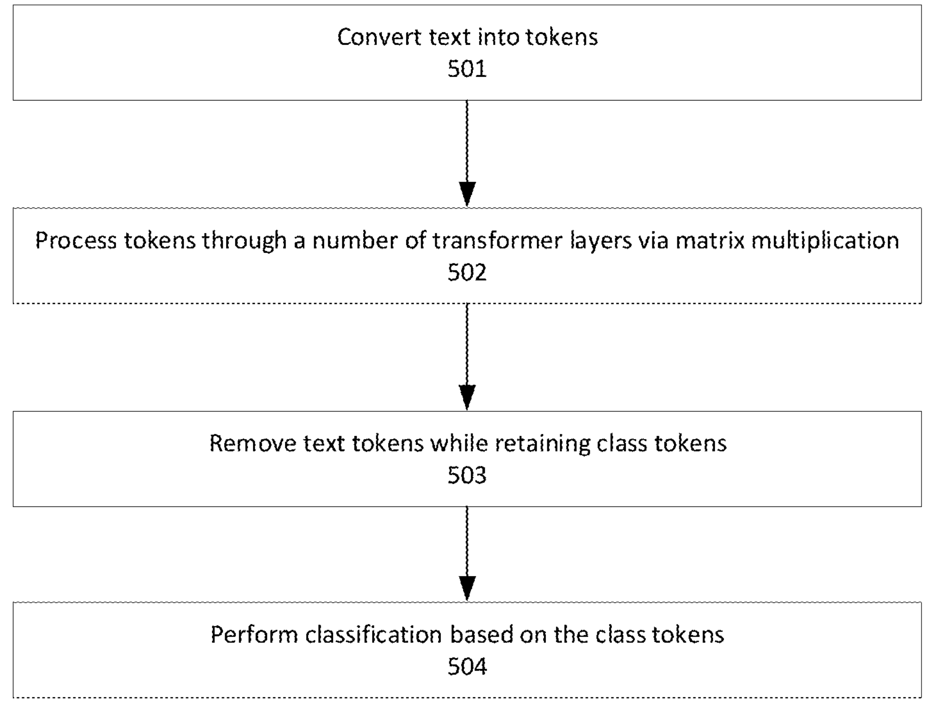
FIG. 5 illustrates a method for converting text tokens to higher level concepts for classification that is utilized in performing false-positive reduction in accordance with an exemplary embodiment.
Figure 6:
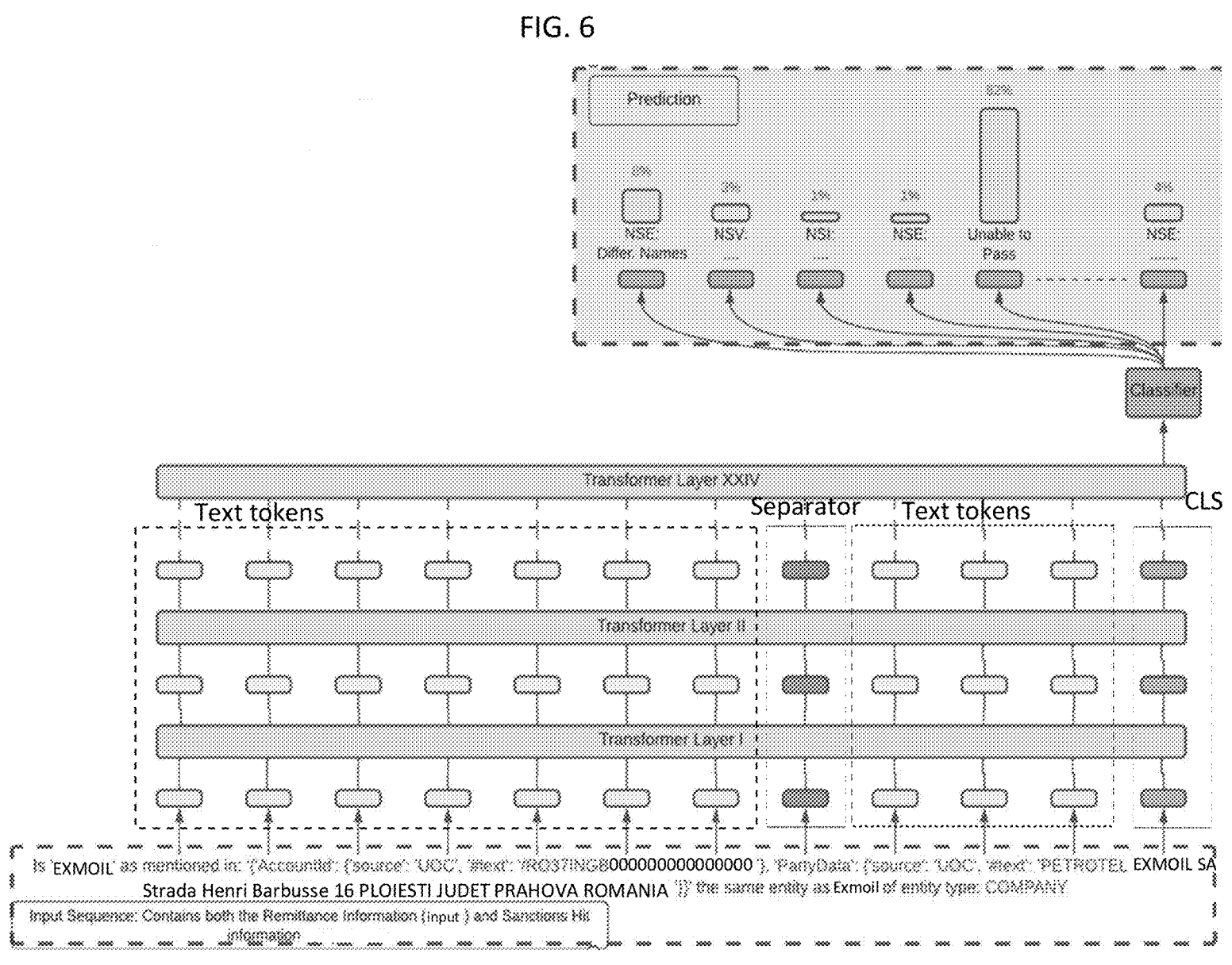

FIG. 5 illustrates a method for converting text tokens to higher level concepts for classification that is utilized in performing false-positive reduction in accordance with an exemplary embodiment. FIG. 6 illustrates a system architecture for converting text tokens to higher level concepts for classification that is utilized in performing false-positive reduction in accordance with an exemplary embodiment.

In operation 501, texts included in the natural language question are converted into various tokens. As exemplarily illustrated in FIG. 6, the tokens include text tokens, separator tokens, and class tokens. According to exemplary aspects, text tokens are tokens corresponding to the actual words in the natural language question. Word to token correspondence may or may not be one-to-one, such that one word may correspond to one token or multiple tokens. Further, these tokens may correspond to learned vectors. Further, a group of tokens may be separated by a separator token, which may provide as an indicator separating groups of text tokens. For example, text tokens left of the separator tokens may correspond to texts included in the data envelope, and text tokens right of the separator tokens may correspond to values include in the list of sanctioned entities. Although separator tokens are described herein, aspects of the present disclosure are not limited thereto, such that text tokens may be provided without having the separator tokens. According to further aspects, the class tokens are provided at the last of the sequence, and are able to see or process all of the tokens that preceded the class token in sequence. The class token based on its position in sequence may be able to learn context of the text tokens by tracking sequence and/or relationship between text tokens or their vectors.

Once the natural language question is tokenized, the tokens (or corresponding vectors) may be processed across multiple transformer layers in operation 502. For example, FIG. 6 illustrates that the tokens are processed through twenty four transformer layers. However, aspects of the present disclosure are not limited thereto, such that the tokens may be process through more or less transformer layers. In an example, each of the transformer layers may perform matrix multiplication for the tokens of vectors.

After processing the tokens or vectors through multiples of transformer layers, the text tokens may be discarded while leaving high dimensional information, such as contextual information, corresponding to the natural language question and class tokens in operation 503.

In operation 504, the class tokens having high dimensionality or context information are inputted to the classifier for classification of the natural language question. For example, classes may include, without limitation, non-sanctioned entity different names, non-sanctioned vessels, non-sanctioned individual, unable to pass, and the like.

Accordingly, by utilizing a neural network model, false-positive detections of sanctioned entity transactions may be automatically performed to reduce false-positive transactions that were conventionally reported or further investigated. Based on the above described novel approach, accuracy of reporting may be improved while reducing amount of transactions to be further investigated.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for reducing false-positives using neural network, the method comprising:

receiving, by a processor, a data envelope in a coding format;

scanning, by the processor, the data envelope and detecting a presence of data corresponding to a value in a list of sanctioned entities, wherein the data corresponding to the value in the list of sanctioned entities is determined to be detected when a match between a text included in the data envelope and the value in the list of sanctioned entities is above a reference threshold, and wherein the value in the list of sanctioned entities includes a logo;

when there is an exact match between the text included in the data envelope and the value in the list of sanctioned entities, flagging the data envelope and reporting the data envelope to a government entity;

when there is no exact match between the text included in the data envelope and the value in the list of sanctioned entities, but a level of match between the text included in the data envelope and the value in the list of sanctioned entities is above the reference threshold for a potential match:

transforming, by the processor, the coding format of the data envelope into a text format;

identifying and extracting, by the processor, target information including the data corresponding to the value in the list of sanctioned entities and surrounding information, wherein the target information includes text information corresponding to a target key field;

reformatting, by the processor, the extracted target information and surrounding information into a natural language question;

processing, by a neural network model executed by the processor, the natural language question;

determining, by the neural network model executed by the processor, whether a sanctioned entity is included or not based on context of the natural language question, wherein the context of the natural language question is provided based on a data field value for a corresponding text value and adjacent text values, and wherein the adjacent text values include a street name; and when the sanctioned entity is determined to be included in the natural language question, reporting the data envelope with a corresponding confidence level to the government entity, wherein the context of the natural language question is further determined by:

tokenizing text of the natural language question to generate a plurality of tokens, and tracking a sequence of the plurality of tokens;

processing the plurality of tokens through a plurality of transformer layers;

removing a portion of the plurality of tokens from further processing while retaining a portion of the plurality of tokens; and performing a classification of the target information included in the natural language question based on the retained portion of the plurality of tokens.

2. The method according to claim 1, wherein the text included in the data envelope corresponding to the value in the list of sanctioned entities includes a foreign language character.

3. The method according to claim 1, further comprising:

when the sanctioned entity is determined to be included in the natural language question, preventing the data envelope from passing.

4. The method according to claim 1, wherein the plurality of tokens includes text tokens, a separator token, and a class token.

5. The method according to claim 4, wherein the separator token separates out one group of text tokens from another group of tokens.

6. The method according to claim 1, wherein the plurality of tokens includes text tokens and a class token.

7. The method according to claim 6, wherein the class token is placed last in sequence among the plurality of tokens.

8. The method according to claim 7, wherein the class token is able to process each of the plurality of tokens preceding the class token for generating the context of the natural language question.

9. The method according to claim 1, wherein the retained portion of the plurality of tokens is a class token.

10. The method according to claim 1, wherein the removed portion of the plurality of tokens includes text tokens.

11. The method according to claim 1, wherein the data envelope is provided in XML.

12. The method according to claim 1, wherein the surrounding information is information other than the target information included in a same data field.

13. The method according to claim 1, wherein, when an entity type corresponding to the target information does not match with an entity type of the sanctioned entity, determining that there is no match.

14. The method according to claim 1, wherein the target information included in the natural language question is determined to be the sanctioned entity when the target information corresponds to a name.

15. The method according to claim 1, wherein the list of sanctioned entities includes an entity, an individual, and a country.

16. The method according to claim 1, wherein the list of sanctioned entities includes names of the sanctioned entities and corresponding entity types.

17. A system for reducing false-positives using neural network, the system comprising:

a memory; and a processor, wherein the system is configured to perform:

receiving a data envelope in a coding format;

scanning the data envelope and detecting a presence of data corresponding to a value in a list of sanctioned entities, wherein the data corresponding to the value in the list of sanctioned entities is determined to be detected when a match between a text included in the data envelope and the value in the list of sanctioned entities is above a reference threshold, and wherein the value in the list of sanctioned entities includes a logo;

when there is an exact match between the text included in the data envelope and the value in the list of sanctioned entities, flagging the data envelope and reporting the data envelope to a government entity;

when there is no exact match between the text included in the data envelope and the value in the list of sanctioned entities, but a level of match between the text included in the data envelope and the value in the list of sanctioned entities is above the reference threshold for a potential match:

transforming the coding format of the data envelope into a text format;

identifying and extracting target information including the data corresponding to the value in the list of sanctioned entities and surrounding information, wherein the target information includes text information corresponding to a target key field;

reformatting the extracted target information and surrounding information into a natural language question;

processing, by a neural network model executed by the processor, the natural language question;

determining, by the neural network model executed by the processor, whether a sanctioned entity is included or not based on context of the natural language question, wherein the context of the natural language question is provided based on a data field value for a corresponding text value and adjacent text values, and wherein the adjacent text values include a street name; and when the sanctioned entity is determined to be included in the natural language question, reporting the data envelope with a corresponding confidence level to the government entity, wherein the context of the natural language question is further determined by:

tokenizing text of the natural language question to generate a plurality of tokens, and tracking a sequence of the plurality of tokens;

processing the plurality of tokens through a plurality of transformer layers;

removing a portion of the plurality of tokens from further processing while retaining a portion of the plurality of tokens; and performing a classification of the target information included in the natural language question based on the retained portion of the plurality of tokens.

18. A non-transitory computer readable storage medium that stores a computer program for reducing false-positives using neural network, the computer program, when executed by a processor, causing a system to perform a plurality of processes comprising:

receiving a data envelope in a coding format;

scanning the data envelope and detecting a presence of data corresponding to a value in a list of sanctioned entities, wherein the data corresponding to the value in the list of sanctioned entities is determined to be detected when a match between a text included in the data envelope and the value in the list of sanctioned entities is above a reference threshold, and wherein the value in the list of sanctioned entities includes a logo;

when there is an exact match between the text included in the data envelope and the value in the list of sanctioned entities, flagging the data envelope and reporting the data envelope to a government entity;

when there is no exact match between the text included in the data envelope and the value in the list of sanctioned entities, but a level of match between the text included in the data envelope and the value in the list of sanctioned entities is above the reference threshold for a potential match:

transforming the coding format of the data envelope into a text format;

identifying and extracting target information including the data corresponding to the value in the list of sanctioned entities and surrounding information, wherein the target information includes text information corresponding to a target key field;

reformatting the extracted target information and surrounding information into a natural language question;

processing, by a neural network model executed by the processor, the natural language question;

determining, by the neural network model executed by the processor, whether a sanctioned entity is included or not based on context of the natural language question, wherein the context of the natural language question is provided based on a data field value for a corresponding text value and adjacent text values, and wherein the adjacent text values include a street name; and when the sanctioned entity is determined to be included in the natural language question, reporting the data envelope with a corresponding confidence level to the government entity, wherein the context of the natural language question is further determined by:

tokenizing text of the natural language question to generate a plurality of tokens, and tracking a sequence of the plurality of tokens;

processing the plurality of tokens through a plurality of transformer layers;

removing a portion of the plurality of tokens from further processing while retaining a portion of the plurality of tokens; and performing a classification of the target information included in the natural language question based on the retained portion of the plurality of tokens.

* * * * *